June 29, 1943.  K. A. McDOWELL  2,323,096
FISHING TACKLE
Filed May 19, 1941
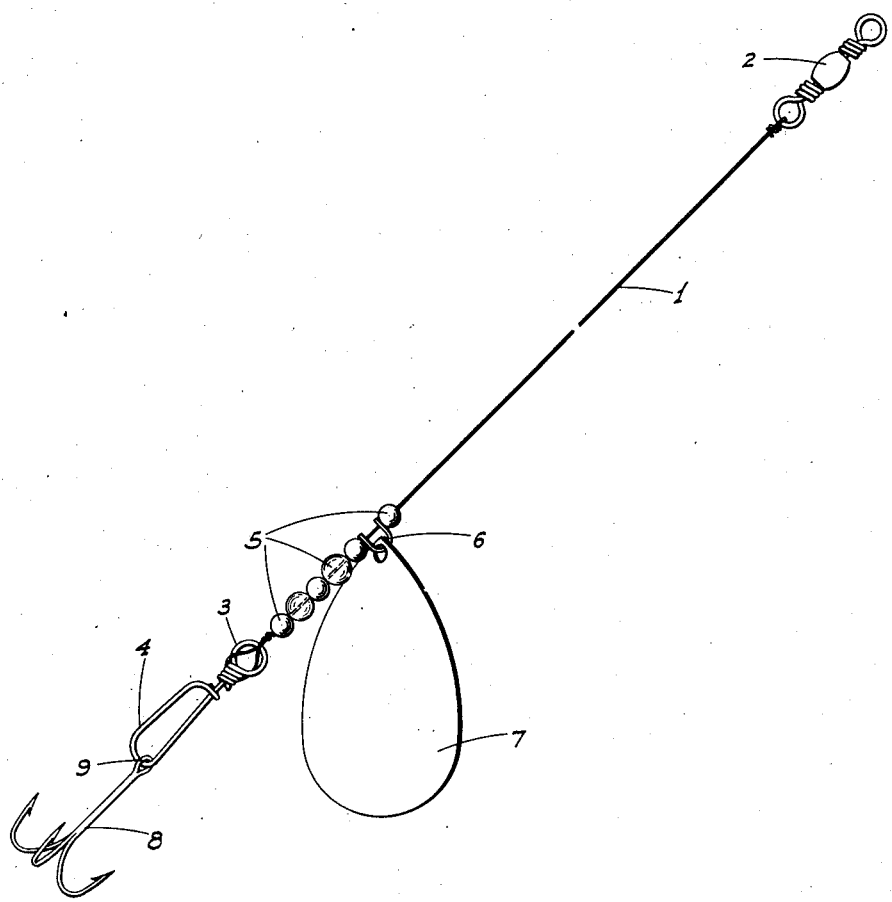
INVENTOR.
K. A. McDowell
BY
Webster & Webster
ATTORNEY.

Patented June 29, 1943

2,323,096

UNITED STATES PATENT OFFICE 2,323,096

FISHING TACKLE

Kenneth A. McDowell, Chico, Calif.

Application May 19, 1941, Serial No. 394,079

2 Claims. (Cl. 43—42)

This invention relates generally to fishing tackle, and in particular the invention is directed to, and it is my principal object to provide, in novel combination, a relatively stiff but resilient leader, a spinner blade, and a hook; the combination being especially designed for casting or trolling.

Another object of the invention is to provide a combination leader, spinner and hook arranged to prevent hookbacks and snarls as commonly occur in conventional tackle, wherein swivels or the like connect between the leader and spinner, and between the spinner and hook snap or ring, permitting the hook to fall back and snag on the spinner attaching element or on the other connections or the leader.

A further object of the invention is to produce a unique assembly of leader, spinner, and hook, especially designed for salmon fishing or other large sporting fish.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

The figure of the drawing is a perspective view of my combination leader, spinner and hook.

Referring now more particularly to the characters of reference on the drawing, the numeral 1 indicates a leader of relatively stiff but resilient material such as spring steel wire, commonly known as piano wire.

At the upper end, the leader 1 is fitted with a swivel 2, while at its lower end the leader is connected—in rigid relation—with the eye 3 of a snap 4; the eye 3 being integral and rigid with the remainder of the snap. As snap 4 is rigid with the leader 1, it projects lengthwise therefrom at all times and cannot swing or fall back onto the leader.

A plurality of alternating red and gold beads 5 are threaded on leader 1 adjacent and above eye 3; and a swinging clevis 6 is threaded on the leader for rotation thereabout, between the end bead most remote from eye 3 and the next adjacent bead. A spinner blade 7 which is silver on one side and copper on the other is suspended from clevis 6 in loose play relation. A hook 8, preferably of the treble barb or ice-tong type, is swively suspended from snap 4, the snap passing through the fixed eye 9 of the hook. The clevis 6 will normally rotate about leader 1, but if any rotative action is imparted to leader 1, this cannot twist the line because of the swivel 2 which is connected between the upper end of the leader and the lower end of the line. The clevis is spaced from eye 3 a greater distance than the shank of the hook, so that the barbs of the hook cannot engage in said clevis.

In use, the piano wire leader and the rigidly attached snap 4 assure that the spinner 7 and hook 8 will each remain separate from the other, and it is not possible for hookbacks or snarls to occur. The connected leader and snap form a unit which tends to remain straight under the influence of the resilient piano wire, and as a result the hook is effectively maintained in non-snagging relation to the balance of the assembly.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In fishing tackle, a relatively stiff resilient leader, a hook-connecting element rigidly secured on one end of the leader whereby said element and adjacent portion of the leader remain in substantial longitudinal alinement, a hook having a rigid shank directly and non-rigidly connected with said element, a spinner blade, and means mounting said blade for rotation about the leader above said element; said means being disposed on the leader a distance above the element greater than the length of the hook, there being beads threaded on the leader and occupying the length thereof, from the element upward to said means.

2. In fishing tackle, a relatively stiff resilient leader, a hook connecting element rigidly secured on one end of the leader whereby said element and adjacent portion of the leader remain in substantial longitudinal alinement, a hook having a rigid shank directly and non-rigidly connected with said element, a spinner blade, and a clevis arranged in loose play connection with the spinner blade, said clevis being attached to the leader for rotation thereabout, the clevis being spaced from said element a distance greater than the length of the hook shank.

KENNETH A. McDOWELL.